னetr
United States Patent Office 3,729,455
Patented Apr. 24, 1973

3,729,455
ELECTROCONDUCTIVE METHOD FOR CONTROLLING ORGANOMETALLIC CATALYTIC POLYMERIZATIONS
Kenneth E. Harwell, Merriam, and Francis R. Galiano, Overland Park, Kans., assignors to Gulf Research & Development Company, Pittsburgh, Pa.
No Drawing. Filed Mar. 11, 1971, Ser. No. 123,426
Int. Cl. C08f 1/00, 3/02, 15/40
U.S. Cl. 260—80.7                     2 Claims

ABSTRACT OF THE DISCLOSURE

A control method comprising measuring the electrical conductivity of an organic solvent olefin polymerization system containing an organometallic catalyst and adjusting the concentration of the organometallic catalyst in said polymerization system responsive to the electroconductivity measurement.

BACKGROUND OF INVENTION

It is known that organometallic compounds formed from a metal of Groups II–A, II–B and III–A of the Periodic Table are useful as cataylsts in the polymerization of olefins containing 2 to 12 carbon atoms per molecule, and especially conjugated dienes of 4 to 8 carbon atoms per molecule such as 1,3-butadiene, isoprene, 2,3-dimethylbutadiene, 2 - methoxy-1,3-hexadiene, 1,3-octadiene, and the like. These conjugated dienes can be polymerized either alone or in admixture with each other and/or with one or more compounds containing an active vinylidene group, $CH_2=C<$, which are copolymerizable with the conjugated dienes. Conventionally such organometallic compounds are useful for polymerizing the aforementioned olefins in the presence of an organic solvent at low pressures and low temperatures. It is also known that catalysts formed by combining an organometallic compound of a metal of Groups II–A, II–B and III–A of the Periodic Table with a halide of a metal of Groups IV–B, V–B or VI–B of the Periodic Table are useful for polymerizing 1-olefins in the presence of an organic solvent at low pressures and low temperatures to form resinous polyolefins.

In preparing such olefin polymerization catalysts, particularly suitable organometallic compounds are the alkyl, especially the lower alkyl compounds, of the metals of Groups I–A, II–A, II–B and III–A, such as lithium, aluminum, zinc, cadmium and beryllium. Organometallic compounds in which the metal is attached to cycloalkyl radicals of 3 to 7 carbon atoms or aromatic radicals such as phenyl, as well as halogenated compounds such as dialkyl aluminum chlorides, are also suitable.

As specific examples of suitable organometallic compounds useful in forming the aforementioned olefin catalysts may be mentioned n-butyl lithium, fluorenyl lithium, sodium naphthalene, the dialkyl cadmiums such as diethylcadmium, dimethylcadmium and diisobutylcadmium, the dialkylzincs such as diethylzinc and dibutylzinc, the trialkylaluminums and dialkylaluminum hydrides such as diisobutylaluminum hydride, diethylaluminum hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having 1 to 4 carbon atoms.

Variations in the concentrations of catalyst poisons in the feed stream to an olefin polymerization reaction zone lead to difficulties in process control and in the control of properties of the polymerization reaction products. For example, in the solution polymerization of butadiene employing organometallic catalysts to form cis-polybutadiene, variations in the level of catalyst poisons in the feed streams affect the rate of the polymerization reaction and the Mooney viscosity of the polymer product. The amount of catalyst required to produce a polymerization reaction product having certain desired properties at the desired rate of reaction comprises the amount of catalyst required to destroy or neutralize the catalyst poisons contained in the feed stream plus the amount of catalyst required to produce the desired rate of reaction and the desired properties of the final product in the absence of any catalyst poisons. Thus, the total quantity of catalyst required to obtain a product having the desired characteristics can readily be determined and the desired amount of catalyst introduced into the reaction zone. A polymerization control system cannot be based upon such a determination, however, because of the variations in the level of catalyst poisons introduced into the polymerization zone during the time it takes for a given variation of a catalyst poison level to show up in the product being analyzed, constantly changes the rate of required catalyst feed to the polymerization zone to maintain a constant reaction rate.

Accordingly, an object of the invention is to provide an improved olefin polymerization process.

Another object of the invention is to provide an effective method of controlling an olefin solution polymerization process.

Yet another object of the invention is to provide an improved olefin polymerization control process wherein the polymerization rate controlling concentration of an organometallic catalyst is maintained substantially constant in the polymerization zone.

Other objects, advantages and features of the invention will be readily apparent to those skilled in the art from the following description and appended claims.

SUMMARY OF INVENTION

By the invention an improved method for controlling the concentration of an organometallic catalyst in an olefin solution polymerization zone is provided whereby the electroconductivity of the reaction medium is determined and a polymerization process parameter is manipulated responsive thereto so as to maintain the polymerization rate controlling concentration of an organometallic catalyst within the polymerization zone at the desired level.

DESCRIPTION OF INVENTION

The invention is applicable to batch or continuous olefin solution anionic polymerization processes employing the above-described organometallic catalysts. Although not to be limited thereto, particularly suitable organometallic catalysts include n-butyl lithium, triethylaluminum, sodium naphthalene and fluorenyl lithium. Olefins employed in solution polymerization processes and within the scope of the invention include the mono 1-olefins, such as propylene, butene-1, pentene-1, hexene-1, 4-methyl - 1 - pentene, vinyl cyclohexane and styrene. The invention is also applicable to the polymerization of conjugated dienes of 4 to 8 carbon atoms per molecule such as 1,3-butadiene, isoprene, 2,3-dimethylbutadiene, 2-methoxy-1,3-hexadiene, 1,3-octadiene, and the like.

Polymerization is effected by contacting the olefin with the organometallic catalyst in the presence of an inert organic solvent. Particularly useful solvents or diluents are those of the group consisting of aromatic, paraffinic and cycloparaffinic hydrocarbons. The preferred hydrocarbons of these types are generally those containing from 4 to 12, inclusive, carbon atoms. Examples of suitable hydrocarbons which can be employed in the solution polymerization process include isobutane, n-pentane, iso-octane, n-dodecane, cyclopentane, cyclohexane, ethylcyclopentane, dimethylcyclopentane, methylcyclohexane, benzene, toluene, xylene, ethylbenzene, naphthalene, and the like. Mixtures of these various materials can also be employed.

The solution polymerization reaction is normally effected at an elevated temperature ranging from about 0 to 200° C., preferably at 40 to 150° C. The polymerization reaction can be conducted at pressures at about atmospheric or above.

Suitable mono 1-olefin polymerization catalyst compositions which can be employed in the control method of this invention are described in U.S. 3,219,648. The catalyst compositions as disclosed in that patent comprise the combination of (a) an organometallic compound in which the metal therein is selected from a member of the group consisting of Groups II–A, II–B and III–A of the Periodic Table, (b) a metal halide in which the metal therein is selected from a member of the group consisting of Groups IV–B, V–B and VI–B of the Periodic Table, and (c) an additive compound selected from the group consisting of those polyamines, polyethers, aminoethers, aminoalcohols and hydroxyethers which normally chelate metals. In one embodiment, the organometallic compound and metal halide are combined in an inert solvent, and advisably in an inert atmosphere, and the additive compound thereafter added to the catalyst slurry. The catalyst composition is then contacted with the olefin under polymerization conditions as described above.

It has been discovered that the concentration of free, ionized organometallic catalyst in the inert organic solvent employed in the polymerization reaction can be determined by measuring the electroconductivity of the polymerization reaction medium. The monomer, polymer and organic solvent can be considered as insulators and thus, the electroconductivity measurements are correlatable with the free or active polymerization rate-controlling concentration of the organometallic catalyst. It has been established that the incremental introduction of catalyst poisons into the polymerization solvent medium containing a fixed concentration of free organometallic ions, reacting with the organometallic catalyst, steadily reduce the electroconductivity of the polymerization mixture until all of the free ions have reacted with the catalyst poisons and no catalyst remains for the initiation of the polymerization reaction.

The monomer, polymer and organic solvent polymerization system function as a fixed resistor in the electroconductivity measurements. This can be demonstrated by varying the voltage between electrodes placed in the solution containing free organometallic ions and measuring the current flowing between the electrodes. In plotting applied voltage versus current, a straight-line relationship is developed. The effect of electrolysis, if occurring at all, is so small as to be inconsequential.

In measuring the flow of current between electrodes placed in the polymerization solution, it is necessary to utilize an instrument having a high impedance value with a very small current output as it may be necessary to measure currents in the range of $10^{-6}$ to $10^{-3}$ microamperes. Suitable current measuring instruments are those having internal impedances in the range of $10^2$ to $10^8$ megohms.

Upon introducing the organometallic catalyst at a rate in excess of that required to effect polymerization into the organic solvent containing the olefin monomer and catalyst poisons, the flow of current between electrodes placed in solvent is essentially non-existent or at least minimal until the impurities or poisons are exhausted. After the impurities are exhausted the flow of current with continued introduction of the organometallic catalyst increases rapidly, indicating an increasing concentration of the free organometallic catalyst in the solvent.

As the concentration of free or disassociated organometallic catalyst in the solvent can be determined by the measurement of electrical current flow which is directly proportional to the concentration of the free ions, and polymerization rate is dependent upon such catalyst concentration, control of the polymerization process can be effected by adjusting the rate of flow of catalyst to the polymerization zone responsive to the current flow determination so as to increase or decrease the polymerization rate. If it is desired to lower the free ion concentration and reduce the polymerization rate, for example, the rate of flow of catalyst would be reduced. A control system based upon the determination of the electrical conductivity of the polymerization medium permits substantially instantaneous control response to changes in impurity or catalyst concentration in the polymerization zone and eliminates the time lag associated with conventional control processes based upon product analysis or reaction temperature measurement.

The inventive method of control based upon measuring the electroconductivity of the organometallic compound in the organic solvent is effective for all ranges of organometallic catalyst concentrations normally employed in olefin polymerization processes. The concentration of organometallic catalyst employed in the polymerization reaction is at least 0.01 and normally is at least 0.1 weight percent based on the weight of monomer feed to the polymerization zone. In particular instances the concentration of organometallic catalyst may range from 2 to 5 weight percent or even considerably higher, depending upon the olefin monomer or monomers being polymerized. The organometallic catalyst to solvent weight ratio should be at least about 0.001:1 with much lower ratios such as 0.0001:1 normally being used.

The following examples are presented to illustrate the features of the invention. It is not intended, however, that the invention should be limited to the specific embodiments illustrated therein.

EXAMPLE I

This example demonstrates the electroconductivity of an organometallic compound in an inert organic solvent. A glass flask was fitted with two platinum electrodes and the current between the electrodes was measured by the application of a 4.5 voltage to the electrodes. 100 ml. of a purified toluene was added to the flask and the current flowing between the electrodes was measured. The measured current was $115 \times 10^{-6}$ microamperes. One milliliter of a solution comprising 2.2 milliequivalents of butyl lithium in toluene was added to the flask and the measured current increased to $19.8 \times 10^{-3}$ microamperes.

EXAMPLE II

In this example the effect of catalyst poisons such as isopropanol upon the free or initiating concentration of the organometallic compound in the organic solvent is demonstrated. 2.25 molar butyl lithium was titrated into 100 ml. of toluene introduced into the flask of Example I. With the increased addition of the butyl lithium, the current increased, attaining a value of $4.0 \times 10^{-3}$ microamperes. A standardized solution of isopropanol was then titrated into the butyl lithium-containing solution. When an amount of isopropanol, equivalent to the butyl lithium added to the solution, was introduced into the flask, the current dorpped to $0.5 \times 10^{-3}$ microamperes.

EXAMPLE III

This example demonstrates that the flow of electrical current is directly proportional to the active catalyst concentration in the organic solvent and thus provides a direct means of controlling the polymerization. In the polymerization of styrene with butyl lithium, the polymerizing species is known to be the styrenyl anion which has a strong reddish-orange color. When butyl lithium is titrated into a solution of styrene, very little current is generated initially due to destruction of the butyl lithium by impurities. As the impurities are exhausted, the current begins a sharp increase and the styrenyl anion color appears simultaneously.

With the passage of time, all the butyl lithium is converted to poly(styrenyl anion). Titration of the polymerizing solution with an isopropanol solution causes a sharp decrease in current when one molar equivalent has been added and the styrenyl anion color disappears simutlaneously with the current drop.

EXAMPLE IV

The addition of polar compounds to organometallic polymerization systems is known to increase the rate of polymerization by increasing the percentage of active catalyst molecules. When styrene, isoprene or butadiene are being polymerized with butyl lithium, the addition of a minor amount of an ether such as tetrahydrofuran or anisole will greatly increase the rate of polymerization. It was observed that the addition of less than 1% of tetrahydrofuran to a toluene solution of butyl lithium caused the current to increase from $19.8 \times 10^{-3}$ microamperes to $35.0 \times 10^{-3}$ microamperes.

The addition of 1% of the ether anisole to a solution of isoprene being polymerized with butyl lithium caused an increase in polymerization rate and 11% increase in the current flowing between the electrodes.

EXAMPLE V

The run of Example I was repeated with the exception that in place of n-butyl lithium, a 5% by volume solution of triethylaluminum in n-hexane was introduced into the flask. The results obtained were similar to those obtained when employing n-butyl lithium with the flow of current between the electrodes being directly proportional to the concentration of free triethylaluminum ions in the toluene solvent.

EXAMPLE VI

The run of Example I was repeated with the exception that the solvent employed was n-hexane. The results obtained were similar to those obtained in Example I with the current flow between electrodes being directly proportional to the concentration of free butyl lithium ions in the solvent.

It has been reported, for example, that butyl lithium molecules are associated in groups or complexes of six butyl lithium molecules and that only the disassociated, individual molecules are active catalysts. Curves of current versus the amount of butyl lithium added to a polymerization organic solvent have the shape characteristic of the disassociation of a six unit complex. Thus, the current is measuring the amount of disassociated molecules which exist as free organometallic ions and are the active catalyst.

Although the invention has been described as it relates to controlling the rate of flow of catalyst into the polymerization zone, it is within the scope of the invention to measure the electroconductivity within the organic solvent and to manipulate other polymerization process variables such as the temperature, pressure and monomer feed rate to the polymerization zone response to the electroconductivity so as to maintain a desired concentration of free organometallic ions in the organic solvent. It is readily apparent to those skilled in the art that the temperature of the polymerization zone can be controlled by, for example, adjusting the rate of flow of a fluid heat exchange medium which is in indirect heat exchange with the polymerization reaction mixture responsive to the electroconductivity measurements.

Although the invention has been described with reference to specific materials, embodiments and details, various modification and changes, within the scope of the invention, will be apparent to those skilled in the art and are contemplated to be embraced in the invention.

What is claimed is:

1. In an olefin solution polymerization process wherein an olefin is contacted with a catalyst including an organometallic compound, in which the metal thereof is selected from a member of the group consisting of Groups I–A, II–A, II–B and III–A of the Periodic Table, in an inert organic solvent at a polymerization temperature and pressure and in a polymerization zone, and wherein the organometallic compound is ionizable in the organic solvent; the improvement which comprises measuring the electrical conductivity between electrodes placed in the organic solvent, and manipulating the rate of flow of said organometallic compound into said polymerization zone responsive to said measurement so as to maintain a desired concentration of free organometallic ions in said organic solvent.

2. The process of claim 1 wherein said organometallic compound is selected from the group consisting of n-butyl lithium, triethylaluminum, sodium naphthalene and fluorenyl lithium.

References Cited

UNITED STATES PATENTS

| | | | |
|---|---|---|---|
| 3,051,690 | 8/1962 | Vandenber | 260—88.2 |
| 3,477,018 | 11/1969 | Richardson et al. | 23—230 R |
| 3,468,764 | 9/1969 | Cohen et al. | 23—230 R |

JOSEPH L. SCHOFER, Primary Examiner

A. HOLLER, Assistant Examiner

U.S. Cl. X.R.

23—230 R; 260—82.1, 85.3 R, 88.2 B, 93.1, 93.5 S, 93.7, 94.2 M, 94.3, 94.9 B, 94.9 P